United States Patent Office 3,838,152
Patented Sept. 24, 1974

3,838,152
POLY α-AMINO PENICILLINS
Joseph P. Hou, Fort Worth, Tex., and John W. Poole, Norristown, Pa., assignors to American Home Products Corporation, New York, N.Y.
No Drawing. Filed Oct. 7, 1971, Ser. No. 187,501
Int. Cl. C07d 99/16
U.S. Cl. 260—239.1
7 Claims

ABSTRACT OF THE DISCLOSURE

High molecular weight dimers, trimers, tetramers of semi synthetic α-amino pencillins are described as being useful against gram-negative and gram-positive infections. The products described herein are absorbed slowly in the body and hence provide longer lasting anti-microbial effect.

---

This invention relates to new synthetic penicillins in the form of dimers, trimers and tetramers.

The new and novel penicillins within the scope of the present invention are exemplied by the following structural formula:

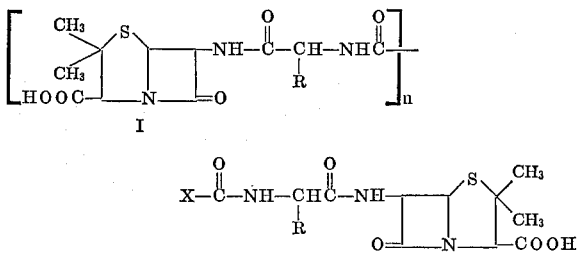

wherein R is a member selected from the group consisting of (lower)alkyl, cycloalkyl having $C_4$ to $C_{10}$ carbon atoms, aryl, aryloxy, aryl(lower)alkyl, heterocyclic, any of which may be substituted by other groups; X is a divalent, trivalent or tetravalent radical selected from the class consisting of (1) an aliphatic radical having up to $C_6$ carbons, (2) a cycloalkyl radical having $C_4$ to $C_{10}$ carbons, (3) a cycloalkenyl radical having $C_4$ to $C_{10}$ carbons, (4) an aryl radical, and (5) a heterocyclic radical; $n$ is a whole number from 1 through 3.

The preferred new penicillins of the present invention are represented by the structural formula:

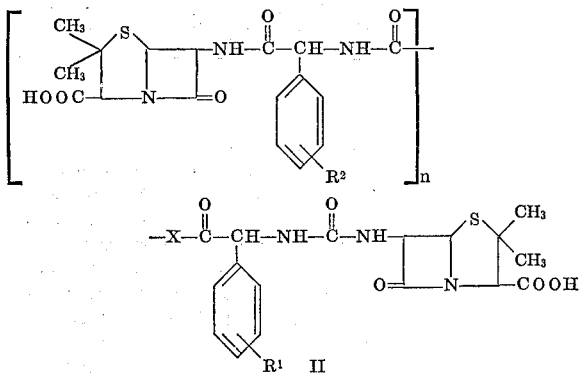

wherein X and $n$ have the same meaning as in formula I and each of $R^1$ and $R^2$ is a member selected from the class consisting of hydrogen, halo, nitro, (lower)alkyl, (lower)alkoxy, di-(lower)alkylamino, (lower)alkanoylamino, (lower)alkanoyloxy, sulfamyl, trifluoromethyl.

The compounds of the present invention may be used in the form of non-toxic salts including non-toxic metallic salts such as sodium, potassium, calcium, aluminum, ammonium, and substituted ammonium salts e.g., salts of triethylamine, procaine, dibenzylamine, 1-ephenamine, N, N'-dibenzylethylenediamine, etc.

As used herein lower alkyl and the like means both straight and branch chain hydrocarbon moieties containing one to six carbon atoms. Illustrative of such groups are methyl, ethyl, propyl, n-butyl, t-butyl, n-hexyl. The term (lower)alkoxy includes methoxy, ethoxy, isopropoxy, n-butoxy, etc. The term "aryl" includes phenyl and fused rings such as naphthyl. The term "ara(lower)alkyl" includes phenethyl, α-phenyl propyl, etc. The term "cycloalkyl" includes cyclobutyl, cyclopentyl, cyclohexyl, cycloheptyl, etc. The term "cycloalkenyl" includes cyclopentenyl, cyclohexenyl, 1,3-cyclobutadienyl, 1,4-cyclohexadienyl, etc. The term "aryloxy" includes phenoxy, phenoxymethyl, phenoxyethyl, etc. The divalent, trivalent and tetravalent aliphatic radicals are illustrated by both saturated and unsaturated straight chain or branch chain alkyl and alkenyl such as methyl, ethyl, propyl, isopropyl, butyl, hexyl, vinyl, butadienyl, etc. The divalent, trivalent and tetravalent "aryl" radical includes the phenyl and naphthyl radicals. The divalent, trivalent and tetravalent "cycloalkyl" and "cycloalkenyl" radicals are illustrated by the corresponding monovalent radicals embraced by the Markush group defined by R supra. The term "heterocyclic" and divalent, trivalent and tetravalent "heterocyclic" includes 5 to 6 membered saturated and unsaturated rings containing one to four hetero atoms which may be nitrogen, oxygen or sulfur. Any of these rings may carry one or more substituents including halogen, (lower)alkyl, (lower)alkoxy, phenyl, etc. Illustrative heterocyclic groups are pyridyl, piperidyl, indolyl, thienyl, triazolyl, pyrazolyl, isoxazolyl, piperazinyl, tetrahydropyridyl, tetrazinyl, oxadiazinyl, furyl, etc. The term "halo" includes chlorine, fluorine, bromine and iodine. In the divalent, trivalent and tetravalent cycloalkyl and cycloalkenyl radicals a bridge consisting of oxygen or a divalent hydrocarbon radical containing one or two carbon atoms may be optionally present.

The novel penicillins of the present invention are capable of existing in a number of stereoisomeric forms, since not only is the α-carbon of the side chain asymmetry but there are usually several centers of asymmetry in the divalent radical X. It is to be understood that the invention includes all such stereoisomers.

The compounds of present invention are prepared according to the following reaction:

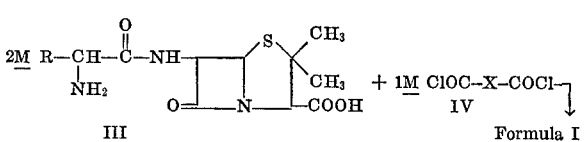

Formula I wherein R and X are as hereinbefore defined.

The process may also be carried out by using other reactive derivatives of the dicarboxylic acid such as the anhydride.

The products of the present invention are prepared by reacting a compound of formula III with an appropriate dicarboxylic acid condensation agent such as cyclobutane dicarboxylic acid, or a reactive derivative form in the ratio of 2 to 1 molar between the two reactants in an aqueous- acetone, p-dioxane, or tetrahydrofuran solvent medium but preferably in 50% aqueous-tetrahydrofuran solvent mixture in the presence of a suitable acid-acceptor, such as disodium phosphate, sodium or potassium carbonate, sodium bicarbonate but preferably sodium bicarbonate in the ratio of one to five moles of the acid-acceptor per mole of the reactant of formula III used, but preferably at a constant pH range from 7 to 8 and at a temperature in the range of −20 to 30° C., but preferably at about −5° C., to 0° C., for a period of time about 1 hour to 5 hours, with a rapid agitation to produce a compound having the formula of I.

The free acids form of these compounds of the present invention are extracted with an organic solvent such as ethyl acetate, isobutyl methyl ketone, diethyl ketone, but preferably ethyl acetate at a pH 2 after the reaction mixture is washed with ether and acidified with a dilute hydrochloric acid, or sulfuric acid, acetic acid, etc., but preferably with a dilute hydrochloric acid. The organic extract is washed with cold water and dehydrated with anhydrous sodium sulfate and concentrated at reduced pressure and lower temperature (10–40° C.).

The cationic salt form of the compounds of the present invention can be prepared by adding an appropriate reagent containing a cationic species, such as the sodium 2-ethylhexanoate, potassium 2-ethylhexanoate in butanol, etc., to the concentrated organic extract in a nonpolar solvent such as ether, hexane, or heptane, but preferably ether until no further crystalline precipitate is formed or to a pH about 8. Similarly, other amine salts of the compounds of the present invention can also be obtained by adding the free amine species to the concentrated organic extract of the penicillin in a suitable solvent such as ether.

The salt form of the products of the present invention are filtered and washed with cold ether and dried at reduced pressure, or redissolved in water and lyophilized.

The new and novel penicillins of the present invention possess valuable biological activity. In particular, in standard and accepted biological tests these compounds have exhibited activity against gram-positive and gram-negative bacteria. In this regard, these compounds are of value as anti-bacterial agents, nutritional supplements in animal feeds, and as therapeutical agents in poultry and mammals, in the treatment of infectious diseases caused by gram-positive and gram-negative bacteria upon either parental or oral administration.

The following examples are given by way of illustration and are not to be construed as limitations of this invention.

EXAMPLE 1

6,6'-[2,2'-(1,2-cyclobutanedicarboxamido) bis (2-phenylacetamido)] dipenicillanic acid, dipotassium salt 0.2 mole (16.8 g.) of sodium bicarbonate are dissolved in 500 ml. of distilled water to which there is added 0.05 mole (18.57 g.) sodium ampicillin and 200 ml. acetone. The solution is cooled to 5–10° C., while stirring well. Thereafter 0.025 mole (4.7 g.) trans-1,2 cyclobutanedicarboxylic acid chloride in 200 ml. acetone is added slowly. The pH is maintained at 7.5–8.5 by addition of sodium hydroxide if necessary. The reaction is allowed to proceed for about 4 hours, then the solution is filtered and washed with two 200 ml. portions of cold ether and the pH adjusted to 2 with N hydrochloric acid. The product is extracted with two, 200 ml. portions of ethylacetate, washed with water and dehydrated with anhydrous sodium sulfate. The extract is concentrated at reduced temperature and pressure. Ether is added and a solution of potassium 2-ethyl hexonate in butanol is added until no further crystalline precipitate forms. The salt is filtered, washed with cold ether, redissolved in water and lyophilized to yield the above-title compound, m.p. 235°–238° C., molecular weight 883.10.

Analysis.—Calc'd (percent): C, 51.68; H, 4.56; N, 9.51; S, 7.26 Found (percent): C, 50.30; H, 4.66; N, 8.56; S. 7.28.

EXAMPLE 2

Following the procedure of Example 1, using trans-1,3-cyclobutanedicarboxylic acid chloride in place of trans-1,2-cyclobutanedicarboxylic acid chloride, the product obtained is 6,6'-[2,2'-(trans - 1,3 - cyclobutanedicarboxamido) bis (2-phenylacetamido)] dipenicillanic acid, dipotassium salt.

EXAMPLE 3

When the procedure of Example 1 is repeated to react an α-amino carboxamido penicillanic acid derivative with an appropriate dicarboxylic acid or active derivative thereof, the following products are obtained as the dipotassium salts:

| Reactants | Products |
|---|---|
| Sodium ampicillin and 1,4-cyclohexane dicarboxylic acid chloride. | 6,6'-[2,2'-(1,4-cyclohexane-dicarboxamido)bis(2-phenyl-acetamido)] dipenicillanic acid. |
| Sodium ampicillin and endo-3,6 endo methylene cyclohex-4-ene cis 1-2 dicarboxy anhydride. | 6,6'-[2,2'-(trans-exo-endo-5-norbornene 2,3-dicarboxamido)bis (2-phenyl-acetamido)] dipenicillanic acid. |
| Sodium ampicillin and maleic acid chloride. | 6,6'-[2,2'-(maleamido)bis(2-phenyl acetamido)]dipenicillanic acid. |
| Sodium ampicillin and adipic acid chloride. | 6,6'-[2,2'-(adipamido)bis(2-phenyl-acetamido)]dipenicillanic acid. |
| Sodium ampicillin and 2,6 pyridyl dicarboxylic acid. | 6,6'-[2,2'-(2,6-pyridine dicarboxamido) bis(2-phenylactamido)]dipenicillanic acid. |
| Sodium ampicillin and 1,3,5 benzenetricarbonyl acid chloride. | 6,6',6''[2,2',2''-(1,3,5 benzenetricarboxamido)bis(2-phenyl-acetamido)] tripenicillanic acid. |
| Sodium ampicillin and cis-exo-7'-oxabicyclo[2,2,1]heptane-2,3-dicarbonyl chloride. | 6,6'-[2,2'-(cis-exo-7-oxabicyclo(2,2,1) heptane-2,3-dicarboxamido)bis(2-phenylacetamido)]dipenicillanic acid. |
| Sodium ampicillin and 2,3 thienyl dicarboxylic acid. | 6,6'-[2,2'-(2,3 thiophenedicarboxamido) bis(2-phenylacetamido)]dipenicillanic acid. |
| Sodium ampicillin and 3,5-furan dicarboxylic acid anhydride. | 6,6'-[2,2'-(3,4-furan dicarboxamido)bis (2-phenylacetamido)]dipenicillanic acid. |

EXAMPLE 4

When the procedure of Example 1 is repeated using a compound formula III in place of sodium ampicillin with R having the meaning as herein defined, reacted with an appropriate reactive dicarboxylic acid derivative, the following products are obtained as the di potassium salt:

| Reactants | Products |
|---|---|
| R=cyclohexyl; and 1,2 cyclobutane dicarboxylic acid. | 6,6'-[2,2'-[1,2-cyclobutane dicarboxamido)bis(2-cyclohexylacetamido)] dipenicillanic acid. |
| R=propyl; and phthalic anhydride. | 6,6'-[2,2'-(phthalimido)bis (butyramido)]dipenicillanic acid. |
| R=2-pyridyl; and 3,5-cyclohexadiene-1,2 carbonyl chloride. | 6,6'-[2,2'(3,5-cyclohexadiene-1,2 dicarboxamido)bis[2-(2-pyridyl acetamido)]dipenicillanic acid. |
| R=phenethyl; and butane 1,4 dicarboxylic acid. | 6,6-[2,2'-(apidamido)bis(4-phenyl-butryamido)]dipenicillanic acid. |
| R=phenoxy; and pyridine 2,5-dicarboxylic acid. | 6,6'-[2,2'-(2,5-pyridine dicarboxamido)-bis(2-phenoxy acetamido)]dipenicillanic acid. |
| R=2-thienyl; and maleic acid chloride. | 6,6'-[2,2'-maleamidobis(2-[2-thienyl] acetamido)]dipenicillanic acid. |
| R=3-piperidyl; and cyclohexane 1,3 dicarboxylic acid. | 6,6'[2,2'-(1,3 cyclohexanedicarboxamido)bis(2-[3-piperidyl]acetamido)] dipenicillanic acid. |

The compounds of formula I of this invention have been found to possess antibacterial activity. Antibacterial screening is carried out by an agar serial dilution technique. Distilled water is used as a vehicle. The stock solution is prepared at 10,000 µg./ml. of substance in the vehicle. Two-fold dilutions are made with sterile water. One ml. quantities of each dilution are incorporated into 9 ml. seed agar in sterile petri dishes. The hardened surface is inoculated with test organisms and incubated 18 hours at 35° C. The end point is reported as a minimal inhibitory concentration (MIC) expressed in g./ml.; the least amount of test substance that will completely inhibit the test organism.

The compound of Example 1 when tested against Staphylococcus aureus 6538P and Staphylococcus aureus Smith gave an MIC value in each case of 3.90 µg./ml. Due to the high molecular weight of the compounds of the present invention they will be absorbed slowly in the body; therefore, a sustained release and long lasting antimicrobial effect may be achieved.

What is claimed is:

1. A compound selected from the group consisting of those having the formula:

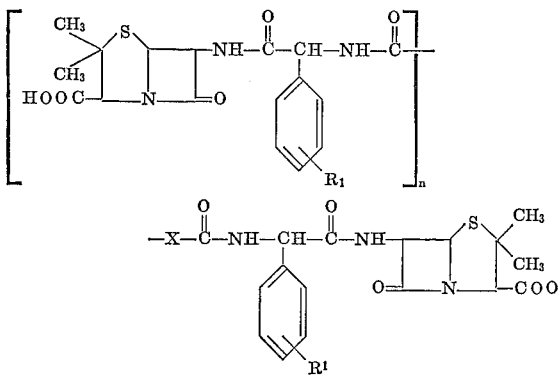

wherein: X is selected from the class consisting of (a) cyclobutyl, cyclopentyl, cyclohexyl, cycloheptyl, cyclopentenyl, cyclohexenyl, 1,4-cyclohexadienyl and (b) a member of the class defined in (a) having a bridge consisting of oxygen or divalent alkylene having one or two carbon atoms; $R^1$ is selected from the group consisting of hydrogen, halogen, nitro, (lower)alkyl, (lower)alkoxy, di(lower)alkylamino, (lower)alkanoylamino, (lower)alkanoyloxy, sulfamyl and trifluoromethyl; $n$ is a whole number from 1 through 3; and the non-toxic addition salts thereof.

2. A compound according to Claim 1 wherein $n$ is 1.

3. A compound according to Claim 2 wherein X is cyclobutyl.

4. A compound according to Claim 2 wherein X is cycloalkenyl.

5. A compound according to Claim 2 wherein X is cyclohexyl.

6. A compound according to Claim 1 wherein said cycloalkenyl is 3,6 endomethylene cyclohex-4-ene.

7. The compound 6,6'[2,2'-(1,2 cyclobutane dicarboxamido)bis(2-phenyl acetamido)] dipenicillanic acid.

References Cited
UNITED STATES PATENTS

| 3,479,339 | 12/1969 | Holdrege et al. | 260—239.1 |
| 3,538,083 | 11/1970 | Grant et al. | 260—239.1 |
| 3,647,780 | 3/1972 | Hardy | 260—239.1 |

NICHOLAS S. RIZZO, Primary Examiner

U.S. Cl. X.R.

424—271